United States Patent
Kashihara et al.

(10) Patent No.: US 10,795,277 B2
(45) Date of Patent: Oct. 6, 2020

(54) CHARGING MEMBER FOR ELECTROPHOTOGRAPHIC APPARATUS

(71) Applicant: Sumitomo Riko Company Limited, Aichi (JP)

(72) Inventors: Shinkichi Kashihara, Aichi (JP); Takeru Horiuchi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 16/812,363

(22) Filed: Mar. 8, 2020

(65) Prior Publication Data

US 2020/0209779 A1 Jul. 2, 2020

Related U.S. Application Data

(63) Continuation of application No. PCT/JP2018/035584, filed on Sep. 26, 2018.

(30) Foreign Application Priority Data

Nov. 30, 2017 (JP) ................................ 2017-229786

(51) Int. Cl.
  *B32B 25/00* (2006.01)
  *G03G 15/02* (2006.01)
  (Continued)

(52) U.S. Cl.
  CPC ......... *G03G 15/0233* (2013.01); *B32B 25/02* (2013.01); *B32B 25/08* (2013.01)

(58) Field of Classification Search
  CPC ........... G03G 15/0233; G03G 15/0818; G03G 15/2057; G03G 15/206; G03G 15/1685;
  (Continued)

(56) References Cited

U.S. PATENT DOCUMENTS

| 6,052,550 | A | * | 4/2000 | Thornton | ............. | G03G 15/162 |
|  |  |  |  |  |  | 399/237 |
| 2002/0086148 | A1 | * | 7/2002 | Tarnawskyj | ....... | G03G 15/0233 |
|  |  |  |  |  |  | 428/215 |

(Continued)

FOREIGN PATENT DOCUMENTS

WO   2012026355   3/2012

OTHER PUBLICATIONS

"International Search Report (Form PCT/ISA/210) of PCT/JP2018/035584," dated Nov. 6, 2018, with English translation thereof, pp. 1-4.

*Primary Examiner* — Robert B Beatty
(74) *Attorney, Agent, or Firm* — JCIPRNET (57) ABSTRACT

A charging member for an electrophotographic apparatus in which image defects caused by bleeding of an ion-conductive agent are suppressed and excellent chargeability can be maintained. In a charging member for an electrophotographic apparatus including a base layer composed of a conductive rubber elastomer and a surface layer, the base layer is a cross-linked body of a conductive rubber composition containing (a) a cross-linkable rubber, (b) a cross-linking agent, (c) an ion-conductive agent represented by a general formula (1) below, and (d) carbon black. Here, $R^1$ and $R^2$ are allyl groups, $R^3$ is a methyl group or an ethyl group, and $R^4$ is a linear alkyl group having a carbon number of 6-8. $X^-$ is a sulfonate anion having a fluorine atom or a bis(sulfonyl) imide anion having a fluorine atom.

1 Claim, 2 Drawing Sheets

(51) Int. Cl.
*B32B 25/02* (2006.01)
*B32B 25/08* (2006.01)

(58) Field of Classification Search
CPC ... G03G 2215/0861; G03G 2215/1614; G03G 2215/2048; G03G 2215/021; B32B 25/02; B32B 25/042; B32B 25/12; B32B 25/14; B32B 25/08; C08J 3/24; C08K 3/04; C08K 5/19; C08L 21/00
USPC .... 399/176, 279, 333, 357, 313; 492/53, 56, 492/59; 428/474.4, 423.9, 424.2
See application file for complete search history.

(56) References Cited

U.S. PATENT DOCUMENTS

| | | | |
|---|---|---|---|
| 2010/0104316 A1* | 4/2010 | Hoshio | G03G 15/0233 399/100 |
| 2012/0288306 A1 | 11/2012 | Ikegami et al. | |
| 2016/0306288 A1* | 10/2016 | Wu | G03G 15/0233 |
| 2017/0115595 A1* | 4/2017 | Nakamura | G03G 21/18 |
| 2018/0011416 A1* | 1/2018 | Horiuchi | C08L 9/02 |
| 2019/0302644 A1* | 10/2019 | Yamada | G03G 15/1685 |

* cited by examiner

CHARGING MEMBER FOR ELECTROPHOTOGRAPHIC APPARATUS

CROSS-REFERENCE TO RELATED APPLICATIONS

This application is a continuation application of International Application number PCT/JP2018/035584 on Sep. 26, 2018, which claims the priority benefit of Japan Patent Application No. 2017-229786, filed on Nov. 30, 2017. The entirety of each of the above-mentioned patent applications is hereby incorporated by reference herein and made a part of this specification.

BACKGROUND OF THE INVENTION

Technical Field

The disclosure relates to a charging member for an electrophotographic apparatus which is suitably used in an electrophotographic apparatus such as a copying machine, a printer, a facsimile or the like which employs an electrophotographic method.

Related Art

Copying or printing by an electrophotographic apparatus is performed in a manner that an original image is formed as an electrostatic latent image on a photosensitive drum charged by a charging member, a toner charged by a developing member is attached to the electrostatic latent image to form a toner image, and the toner image is transferred to copying paper. A charging member having a base layer and a surface layer is known. For example, in patent literature 1 (International Publication No. 2012/026355), a charging roll is recited which has a base layer composed of a conductive rubber elastomer on an outer periphery of a core bar and has a surface layer on an outer periphery of the base layer.

In patent literature 1, an ion-conductive agent in which cation is composed of diallyl dimethyl ammonium is used in the base layer. It is inferred that the cation forms, by having two aryl groups, a bond with a base polymer of the base layer when the base polymer is cross-linked. Accordingly, since the cation is fixed in the base layer, bleeding of the ion-conductive agent is suppressed. However, this alone does not sufficiently suppress the bleeding of the ion-conductive agent, and the ion-conductive agent may bleed from the base layer to the surface layer, leading to image defects. It is inferred that this is because even the cation having two aryl groups may not form a bond with the base polymer when the base polymer of the base layer is cross-linked, and accordingly, the bleeding of the ion-conductive agent occurs.

The disclosure provides a charging member for an electrophotographic apparatus in which image defects caused by bleeding of an ion-conductive agent are suppressed and excellent chargeability can be maintained.

SUMMARY

In some of exemplary embodiments, the charging member for an electrophotographic apparatus according to the disclosure has a base layer composed of a conductive rubber elastomer and a surface layer, wherein
the base layer is a cross-linked body of a conductive rubber composition containing
(a) a cross-linkable rubber,
(b) a cross-linking agent,
(c) an ion-conductive agent represented by general formula (1) below, and
(d) carbon black.

[Chemical formula 1]

Here, $R^1$ and $R^2$ are allyl groups, $R^3$ is a methyl group or an ethyl group, and $R^4$ is a linear alkyl group having a carbon number of 6-8; $X^-$ is a sulfonate anion having a fluorine atom or a bis(sulfonyl) imide anion having a fluorine atom.

DESCRIPTION OF THE EMBODIMENTS

The disclosure is specifically described below.

Figure 1A:
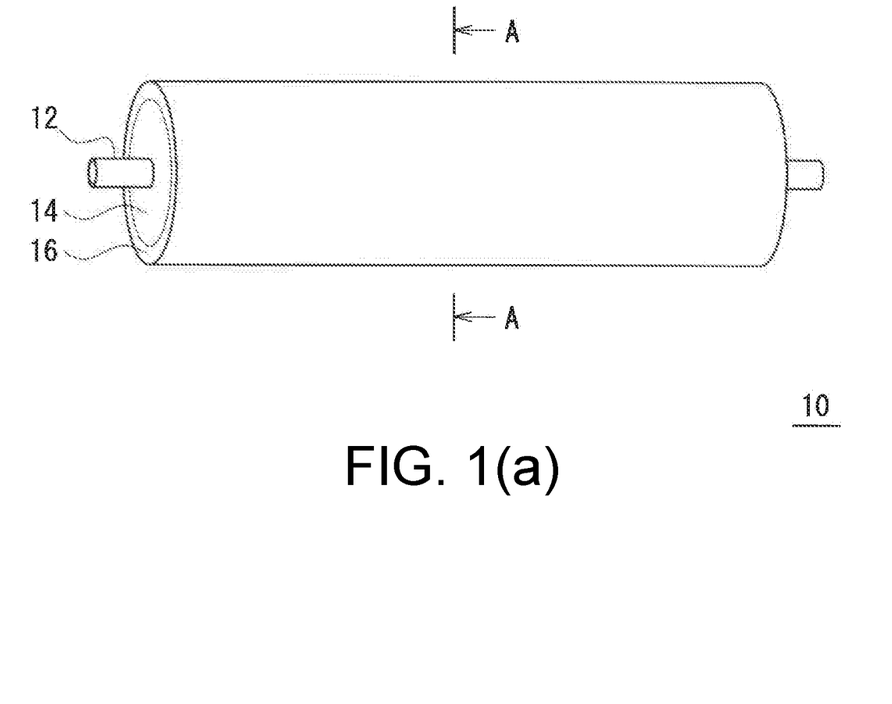
FIG. 1(a) shows a schematic external view of a charging roll for an electrophotographic apparatus according to an embodiment of the disclosure and FIG. 1(b) shows a cross-sectional view along an A-A line of the FIG. 1(a).
Figure 1B:
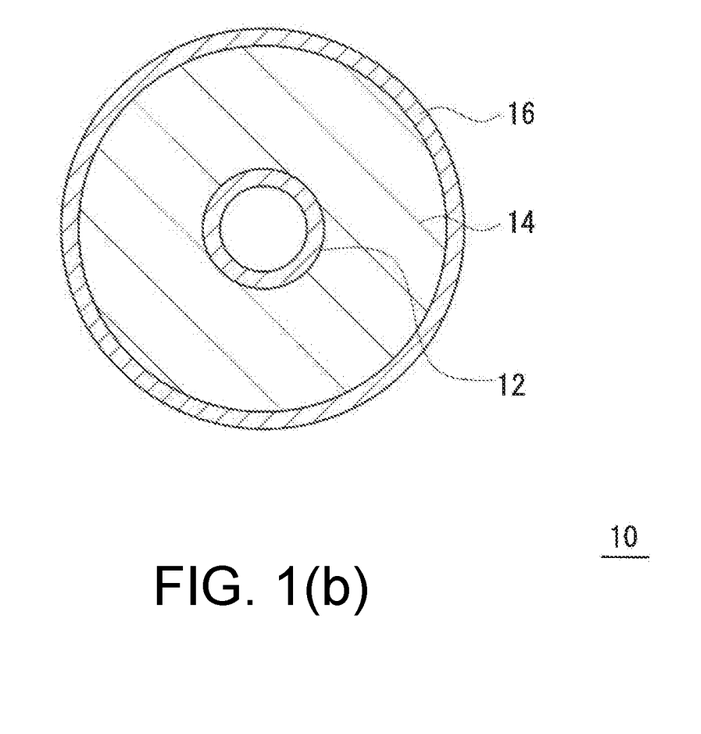
Figure 2:
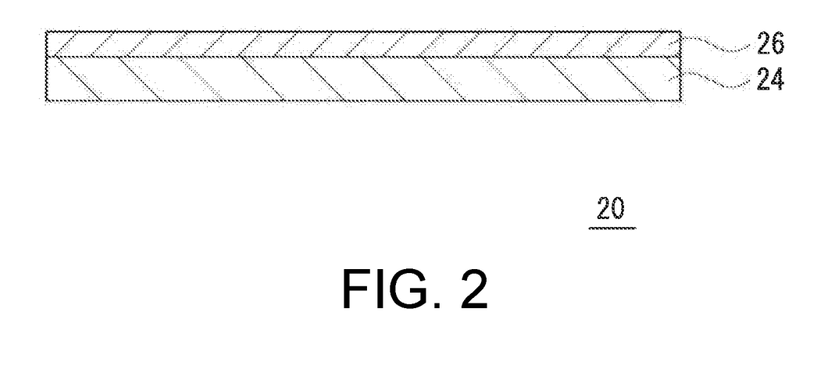
FIG. 2 is a schematic cross-sectional view of a charging blade for an electrophotographic apparatus according to an embodiment of the disclosure.

As long as a charging member for an electrophotographic apparatus according to the disclosure charges an object to be charged such as a photosensitive drum or the like, the shape is not particularly limited. For example, the charging member having a shape such as a roll shape, a blade shape or the like is applicable. FIG. 1(a) and FIG. 1(b) show an embodiment of a roll-shaped charging member (a charging roll). FIG. 2 shows an embodiment of a blade-shaped charging member (a charging blade).

As shown in FIG. 1(a) and FIG. 1(b), a charging roll 10 includes a shaft body 12, a base layer 14 formed on an outer periphery of the shaft body 12, and a surface layer 16 formed on an outer periphery of the base layer 14. The base layer 14 is a layer which serves as a base of the charging roll 10. The surface layer 16 is a layer which appears on a surface of the charging roll 10.

As shown in FIG. 2, a charging blade 20 includes a base layer 24 and a surface layer 26 formed on a surface of the base layer 24. The base layer 24 is a layer which serves as a base of the charging blade 20. The surface layer 26 is a layer which appears on a surface of the charging blade 20.

The charging roll 10 is described below as an example. The base layer 24 and the surface layer 26 of the charging blade 20 have the same material structure as the base layer 14 and the surface layer 16 of the charging roll 10.

The base layer 14 is a cross-linked body of a conductive rubber composition containing the following (a) to (d). The base layer 14 is composed of a conductive rubber elastomer.
(a) a cross-linkable rubber
(b) a cross-linking agent
(c) a specified ion-conductive agent
(d) carbon black The (a) cross-linkable rubber is a rubber which can be cross-linked using the (b) cross-linking agent. A cross-linked rubber is obtained by cross-linking the uncross-linked cross-linkable rubber. The cross-linked rubber constitutes a base polymer of the base layer 14. The cross-linkable rubber may be a polar rubber or a nonpolar rubber. From the viewpoint of excellent conductivity or the like, the cross-linkable rubber may be, in some embodiments, a polar rubber.

The polar rubber is a rubber having a polar group, and the polar group may be a chloro group, a nitrile group, a carboxyl group, an epoxy group, or the like. Specifically, the polar rubber may be a hydrin rubber, a nitrile rubber (NBR), a urethane rubber (U), an acrylic rubber (a copolymer of acrylic ester and 2-chloroethyl vinyl ether, ACM), a chloroprene rubber (CR), an epoxidized natural rubber (ENR), or the like.

Of the polar rubbers, from the viewpoint that the volume resistivity of the above conductive rubber composition is particularly easily lowered or the like, may be the hydrin rubber and the nitrile rubber (NBR).

The hydrin rubber may be a homopolymer of epichlorohydrin (CO), an epichlorohydrin-ethylene oxide binary copolymer (ECO), an epichlorohydrin-allyl glycidyl ether binary copolymer (GCO), an epichlorohydrin-ethylene oxide-allyl glycidyl ether ternary copolymer (GECO), or the like.

The urethane rubber may be a polyether-type urethane rubber having an ether bond in a molecule, or the like. The polyether-type urethane rubber can be produced by a reaction between a polyether having hydroxyl groups at both terminals and a diisocyanate. The polyether may be, but not particularly limited to, polyethylene glycol, polypropylene glycol, or the like. The diisocyanate may be, but not particularly limited to, tolylene diisocyanate, diphenylmethane diisocyanate, or the like.

The nonpolar rubber may be an isoprene rubber (IR), a natural rubber (NR), a styrene butadiene rubber (SBR), a butadiene rubber (BR), or the like.

The (b) cross-linking agent cross-links the (a) cross-linkable rubber. The (b) cross-linking agent is not particularly limited as long as it cross-links the (a) cross-linkable rubber. The (b) cross-linking agent may be a sulfur cross-linking agent, a peroxide cross-linking agent, or a dechlorination cross-linking agent. These cross-linking agents may be used alone or in combination of two or more.

The sulfur cross-linking agent may be a conventionally known sulfur cross-linking agent such as powdered sulfur, precipitated sulfur, colloidal sulfur, surface-treated sulfur, insoluble sulfur, sulfur chloride, thiuram vulcanization accelerator, polymer polysulfide, or the like.

The peroxide cross-linking agent may be a conventionally known peroxide cross-linking agent such as peroxyketal, dialkyl peroxide, peroxyester, ketone peroxide, peroxydicarbonate, diacylperoxide, hydroperoxide, or the like.

The dechlorination cross-linking agent may be a dithiocarbonate compound. More specifically, the dechlorination cross-linking agent may be quinoxaline-2,3-dithiocarbonate, 6-methylquinoxaline-2,3-dithiocarbonate, 6-isopropylquinoxaline-2,3-dithiocarbonate, 5,8-dimethyquinoxaline-2,3-dithiocarbonate, or the like.

When the dechlorination cross-linking agent is used as the (b) cross-linking agent, a dechlorination cross-linking accelerator may be used in combination. The dechlorination cross-linking accelerator may be 1,8-diazabicyclo (5,4,0) undecene-7 (hereinafter, abbreviated as DBU) or a weak acid salt thereof. The dechlorination cross-linking accelerator may be used in the form of DBU, but from the viewpoint of handling, the dechlorination cross-linking accelerator may be used in the form of weak acid salt. The weak acid salt of the DBU may be carbonate, stearate, 2-ethylhexylate, benzoate, salicylate, 3-hydroxyl-2-naphthoate, phenolic resin salt, 2-mercaptobenzothiazole salt, 2-mercaptobenzimidazole salt, or the like.

In the above conductive rubber composition, in consideration of the hardness, the degree of cross-linking and the like of the base layer 14, a content of the (b) cross-linking agent may be within a range of 0.5-7.0 parts by mass with respect to 100 parts by mass of the (a) cross-linkable rubber. The content of the (b) cross-linking agent may be, in some embodiments, within a range of 1.0-5.0 parts by mass.

The (c) specified ion-conductive agent is a quaternary ammonium salt represented by the following general formula (1).

[Chemical formula 2]

Here, $R^1$ and $R^2$ are allyl groups, $R^3$ is a methyl group or an ethyl group, and $R^4$ is a linear alkyl group having a carbon number of 6-8. $X^-$ is a sulfonate anion having a fluorine atom or a bis(sulfonyl) imide anion having a fluorine atom.

The sulfonate anion having a fluorine atom in the $X^-$ may be perfluoroalkane sulfonate such as trifluoromethane sulfonate (TF), pentafluoroethane sulfonate, heptafluoropropane sulfonate, or the like. In addition, the bis(sulfonyl) imide anion having a fluorine atom in the $X^-$ may be perfluorobis(sulfonyl) imide such as N,N-bis(fluorosulfonyl) imide (FSI), N,N-bis(trifluoromethanesulfonyl) imide (TFSI), N,N-bis(pentafluoroethanesulfonyl) imide, N,N-bis(heptafluoropropanesulfonyl) imide, N,N-bis(nonafluorobutanesulfonyl) imide, or the like. These anions may be contained alone as the anion of the (c) specified ion-conductive agent, or may be contained in combination of two or more. Of these anions, from the viewpoint of easy ion dissociation, may be TF, FSI, TFSI, and the like.

In the above conductive rubber composition, in consideration of the conductivity or the bleeding of the ion-conductive agent, a content of the (c) specified ion-conductive agent may be within a range of 0.1-10 parts by mass with respect to 100 parts by mass of the (a) cross-linkable rubber. The content of the (c) specified ion-conductive agent may be, in some embodiments, within a range of 0.3-5.0 parts by mass, and in some embodiments within a range of 0.5-3.0 parts by mass.

The (d) carbon black is used as an electronic conductive agent in the base layer 14. The (d) carbon black may use those with a specific surface area in a predetermined range. The specific surface area of the (d) carbon black may be within a range of 40-300 m$^2$/g. The specific surface area of the (d) carbon black may be, in some embodiments, within a range of 42-240 m$^2$/g. The specific surface area of the (d) carbon black can be measured by a nitrogen adsorption method.

In the above conductive rubber composition, in consideration of the hardness or the conductivity of the base layer 14, a content of the (d) carbon black may be within a range of 5-40 parts by mass with respect to 100 parts by mass of the (a) cross-linkable rubber. The content of the (d) carbon black may be, in some embodiments, within a range of 10-30 parts by mass.

The above conductive rubber composition may include, as necessary, one or more kinds of various additives such as an electronic conductive agent other than the (d) carbon black, a lubricant, an anti-aging agent, a light stabilizer, a viscosity modifier, a processing aid, a reaction aid, a flame retardant, a plasticizer, a foaming agent, a filler, a dispersant, an antifoaming agent, a pigment, a release agent, and the like.

The thickness of the base layer 14 is not particularly limited, and the thickness of the charging roll 10 may be, in some embodiments, within a range of 0.1-10 mm, in some embodiments within a range of 0.5-5 mm, and in some embodiments within a range of 1-3 mm.

The volume resistivity of the base layer 14 is not particularly limited and the volume resistivity of the charging roll 10 may be, in some embodiments, within a range of $10^2$-$10^{10}$ $\Omega \cdot cm$, in some embodiments within a range of $10^3$-$10^9$ $\Omega \cdot cm$, and in some embodiments within a range of $10^4$-$10^8$ $\Omega \cdot cm$.

The shaft body 12 is not particularly limited as long as it has conductivity. Specifically, the shaft body 12 may be a core bar or the like composed of a solid body or a hollow body made of metal such as iron, stainless steel, aluminum or the like. A surface of the shaft body 12 may be coated with an adhesive, a primer, or the like as necessary. The adhesive, the primer, or the like may be made conductive as necessary.

The surface layer 16 may function as a protective layer or the like of the roll surface. The surface layer 16 may contains, as a main material, a polymer component such as polyamide, polyurethane, an acrylic resin, an alkyd resin, a phenol resin, a fluorine resin, a silicone resin, a modified product thereof, or the like. A modifying group in the modified product may be, for example, N-methoxy methyl group, a silicone group, a fluorine group, or the like. These polymer components may be contained alone as a surface layer material, or may be contained in combination of two or more. The polymer component of the surface layer 16 may be cross-linked.

In order to impart the surface layer 16 with conductivity, a conventionally known conductive agent such as carbon black, graphite, c-$TiO_2$, c-ZnO, c-$SnO_2$ (c-means conductivity), an ion-conductive agent (a quaternary ammonium salt, borate, surfactant or the like), or the like can be appropriately added. In addition, various additives may also be appropriately added as necessary. In addition, in order to secure surface roughness, particles for forming roughness may be added.

The particles for forming roughness form surface irregularities on the surface layer 16. The particles for forming roughness may be resin particles, silica particles, or the like. The resin particles may be urethane particles, silicone particles, acrylic particles, or the like. An average particle diameter of the particles for forming roughness may be within a range of 3-50 μm. The average particle diameter of the particles for forming roughness can be calculated from a median diameter using a laser diffraction particle size distribution analyzer.

The thickness of the surface layer 16 is not particularly limited and may be, in some embodiments, within a range of 0.01 to 100 μm, in some embodiments within a range of 0.1 to 20 μm, and in some embodiments within a range of 0.3 to 10 μm. The volume resistivity of the surface layer 16 may be, in some embodiments, within a range of $10^7$-$10^{12}$ $\Omega \cdot cm$, in some embodiments within a range of $10^8$-$10^{11}$ $\Omega \cdot cm$, and in some embodiments within a range of $10^9$-$10^{10}$ $\Omega \cdot cm$.

The charging roll 10 can be produced in the following way for example. First, the shaft body 12 is coaxially installed in a hollow portion of a roll molding die, the above conductive rubber composition is injected, heated and cured, and then demolded, or the above conductive rubber composition is extruded and molded on the surface of the shaft body 12, and thereby, the base layer 14 is formed on the outer periphery of the shaft body 12. Next, the surface layer 16 is formed by coating an outer periphery of the formed base layer 14 with a composition for forming surface layer, and performing ultraviolet irradiation or heat treatment as necessary. Accordingly, the charging roll 10 can be produced.

The composition for forming surface layer is composed of the above main material, a conductive agent, and other additives contained as necessary. The other additives may be a polymer component cross-linking agent, a leveling agent, a surface modifier, or the like. From the viewpoint of adjusting viscosity, the composition for forming surface layer may appropriately contain a solvent such as an organic solvent such as methyl ethyl ketone, toluene, acetone, ethyl acetate, butyl acetate, methyl isobutyl ketone (MIBK), THF, DMF, or a water-soluble solvent such as methanol, ethanol, or the like. As a coating method, various coating methods such as a roll coating method, a dipping method, a spray coating method or the like can be applied.

According to the charging roll 10 having the above-described configuration, the base layer 14 is a cross-linked body of the conductive rubber composition containing the (a) polar rubber, the (b) cross-linking agent, the (c) specified ion-conductive agent, and the (d) carbon black, image defects caused by the bleeding of the (c) specified ion-conductive agent can be suppressed and excellent chargeability can be maintained. This is presumably due to the following mechanism.

The specified ion-conductive agent represented by the above general formula (1) has a sulfonate anion having a fluorine atom or a bis(sulfonyl) imide anion having a fluorine atom as an anion. The anion contains a fluorine group in its structure, and thus the anion has a low basicity and forms a relatively weak ionic bond with a cation. Therefore, the (c) specified ion-conductive agent is easily dissociated into ions in the (a) polar rubber. Accordingly, not only can a value of the relative dielectric constant of the (c) specified ion-conductive agent be increased to increase the charging performance of the base layer 14, but the degree of freedom of the cation is also increased, and the cation having two allyl groups easily gets a high molecular weight.

The cation of the (c) specified ion-conductive agent can be represented by the following general formula (2). m is 0 or 1, and n is an integer of 5-7.

[Chemical formula 3]

(2)

By having two allyl groups, the cation of the (c) specified ion-conductive agent is increased in molecular weight as shown in the following formula (3) in the presence of radical (in the presence of a cross-linking agent) when the (a) polar rubber of the base layer 14 is cross-linked. At this time, a bond is formed with the (a) polar rubber. Accordingly, the cation of the (c) specified ion-conductive agent is taken in and fixed in a polymer skeleton of the (a) polar rubber by a structure shown by the following formula (3). At this time, even the cation having two allyl groups, the cation having two allyl groups may not form a bond with the (a) polar rubber when the (a) polar rubber of the base layer 14 is cross-linked. A cation which does not form a bond with the (a) polar rubber is adsorbed by the (d) carbon black due to interaction between the linear alkyl group in the cation and the (d) carbon black in the base layer. Accordingly, bleeding of the (c) specified ion-conductive agent is suppressed, and image defects are suppressed.

[Chemical formula 4]

(3)

Here, 1 is the number of the repeating unit and is an arbitrary positive integer.

The cation of the (c) specified ion-conductive agent is more easily adsorbed by the (d) carbon black when the surface charge density is higher. The surface charge density is smaller when a chain of the alkyl group of the cation is longer. That is, the longer the chain of the alkyl group of the cation, the more difficult for the cation to be adsorbed by the (d) carbon black. On the other hand, if the chain of the alkyl group of the cation is short, the interaction with the anion becomes strong, the ion dissociation becomes difficult, and the conductivity decreases. If m is an integer greater than 1, even if n is an integer of 5-7, the interaction between the cation and the (d) carbon black is reduced, and the bleeding of the (c) specified ion-conductive agent is not sufficiently suppressed. If n is an integer greater than 7, even if m is 0 or 1, the interaction between the cation and the (d) carbon black is reduced, and the bleeding of the (c) specified ion-conductive agent is not sufficiently suppressed. If n is an integer smaller than 5, even if m is 0 or 1, the interaction between the cation and the anion becomes strong, the ion dissociation becomes difficult, and the conductivity is not satisfied. Therefore, m in the above general formulas (2) and (3) is 0 or 1, and n is an integer of 5-7.

With respect to the (d) carbon black, the greater the specific surface area is, the more easily the cation of the (c) specified ion-conductive agent is adsorbed. On the other hand, the greater the specific surface area is, the easier it is to aggregate, and the conductivity decreases. Therefore, from the viewpoint of excellent balance between an effect of suppressing the bleeding of the (c) specified ion-conductive agent and chargeability, the specific surface area of the (d) carbon black may be within a range of 40-300 $m^2/g$. The specific surface area may be, in some embodiments, within a range of 42-240 $m^2/g$.

From the viewpoints of excellent toner adhesion prevention, being flexible and unlikely to damage the object to be charged, or the like, the surface layer 16 may contain at least one component selected from polyamide, polyurethane, and acrylic resin. In this case, although the ion-conductive agent usually tends to easily pass through the surface layer 16, the effect of suppressing the bleeding of the (c) specified ion-conductive agent is excellent according to the disclosure even with this surface layer 16. At this time, if the polymer components of the surface layer 16 are cross-linked, the bleeding of the (c) specified ion-conductive agent is suppressed more easily compared with a case that the polymer components are not cross-linked.

A configuration of the charging roll according to the disclosure is not limited to the configuration shown in FIG. 1(a) and FIG. 1(b). For example, the charging roll 10 shown in FIG. 1(a) and FIG. 1(b) may have a configuration in which another elastomer layer is included between the shaft body 12 and the base layer 14. In this case, the another elastomer layer is a layer serving as the base of the charging roll, and the base layer 14 functions as a resistance adjusting layer for adjusting resistance of the charging roll. Another elastomer layer can be configured by, for example, any of the materials listed as materials configuring the base layer 14. In addition, for example, the charging roll 10 shown in FIG. 1(a) and FIG. 1(b) may also have a configuration in which another elastomer layer is included between the base layer 14 and the surface layer 16. In this case, the base layer 14 is a layer serving as the base of the charging roll, and the another elastomer layer functions as a resistance adjusting layer for adjusting the resistance of the charging roll.

Implementation Examples

The disclosure is specifically described below using implementation examples and comparison examples. Moreover, in the implementation example, a charging roll having a two-layer structure in which a base layer and a surface layer are laminated in this order on an outer periphery of a shaft body is taken as an example, but the disclosure is not limited to this configuration.

<Preparation of Ion-Conductive Agent <1>: Diallyl/C1/C6-TFSI>

150 mmol of diallylmethylamine, 180 mmol of n-hexyl bromide, and 50 g of acetonitrile are mixed and reacted at 105° C. for 24 hours. Thereafter, the reaction solution is cooled to room temperature, hexane is added to extract and remove unreacted components, and the remaining solution is concentrated under reduced pressure using an evaporator to obtain diallylhexylmethylammonium-bromide. Next, the obtained diallylhexylmethylammonium-bromide and lithium bis(trifluoromethane sulfonyl) imidate are added to an aqueous solvent and stirred at room temperature for 4 hours, and thereby diallylhexylmethylammonium-bis(trifluoromethane sulfonyl) imide is prepared.

<Preparation of Ion-Conductive Agent <2>: Diallyl/C1/C8-TFSI>

Except that n-octyl bromide is used in place of n-hexyl bromide, diallyloctylmethylammonium-bis(trifluoromethane sulfonyl) imide is prepared similarly to the preparation of the ion-conductive agent <1>.

<Preparation of Ion-Conductive Agent <3>: Diallyl/C2/C6-TFSI>

500 mmol of n-hexylamine and 384 g of 25 wt % sodium hydroxide aqueous solution (2400 mmol of sodium hydroxide) are mixed and heated to 80° C. Thereafter, 1200 mmol of allyl chloride is added dropwise over 2 hours and stirred at 80° C. for 2 hours. Only an oil layer is taken out from the obtained liquid, and excess allyl chloride is distilled off under reduced pressure, and thereby diallylhexylamine is obtained. Next, diallylhexylethylammonium-bromide is obtained by reacting the obtained diallylhexylamine and ethyl bromide in an organic solvent. Then, the obtained diallylhexylethylammonium-bromide and lithium bis(trifluoromethane sulfonyl) imidate are added to an aqueous solvent and stirred at room temperature for 4 hours, and thereby diallylhexylethylammonium-bis(trifluoromethane sulfonyl) imide is prepared.

<Preparation of Ion-Conductive Agent <4>: Diallyl/C1/C9-TFSI>

Except that n-nonyl bromide is used in place of n-hexyl bromide, diallylnonylmethylammonium-bis(trifluoromethane sulfonyl) imide is prepared similarly to the preparation of the ion-conductive agent <1>.

<Preparation of Ion-Conductive Agent <5>: Diallyl/C1/C5-TFSI>

Except that n-pentylbromide is used in place of n-hexyl bromide, diallylpentylmethylammonium-bis(trifluoromethane sulfonyl) imide is prepared similarly to the preparation of the ion-conductive agent <1>.

<Preparation of Ion-Conductive Agent <6>: Diallyl/C3/C6-TFSI>

Except that n-propyl bromide is used in place of ethyl bromide, diallylhexylpropylammonium-bis(trifluoromethane sulfonyl) imide is prepared similarly to the preparation of the ion-conductive agent <3>.

The following materials are prepared as materials other than the ion-conductive agent of the conductive rubber composition.

Cross-linkable rubber
Hydrin rubber: ECO, "Hydrin T3106" made by Zeon Corporation
Nitrile rubber: NBR, "Nipol DN302" made by Zeon Corporation
Cross-linking agent
Peroxide: "percumyl D40" made by NOF Corporation
Carbon black
Carbon black <1>: "Seast SO" made by Tokai Carbon Corporation, specific surface area 42 $m^2/g$
Carbon black <2>: "Seast 9" made by Tokai Carbon Corporation, specific surface area 142 $m^2/g$
Carbon black <3>: "BLACK PEARLS 880" made by Cabot Corporation, specific surface area 240 $m^2/g$
Stearic acid (processing aid) ["stearic acid Sakura" made by NOF Corporation]
Zinc oxide (reaction aid)["zinc oxide type II" made by Sakai Chemical Industry Co., Ltd.]
Hydrotalcite (reaction aid) ["DHT4A" made by Kyowa Chemical Industry Co., Ltd.]

Implementation Example 1

<Preparation of Conductive Rubber Composition>

With respect to 100 parts by mass of the hydrin rubber, 20 parts by mass of the carbon black <1>, 1 part by mass of the ion-conductive agent <1>, 3 parts by mass of the cross-linking agent, 0.7 part by mass of stearic acid, 5 parts by mass of zinc oxide, and 2 parts by mass of hydrotalcite are blended, and these components are stirred and mixed with a stirrer to prepare the conductive rubber composition according to implementation example 1.

<Fabrication of Base Layer>

A core bar (with a diameter of 6 mm) is set in a molding die, the above conductive rubber composition is injected and heated at 170° C. for 30 minutes, and then is cooled and demolded, and a base layer composed of a conductive rubber elastomer with a thickness of 1.75 mm is formed on an outer periphery of the core bar.

<Fabrication of Surface Layer>

100 parts by mass of N-methoxymethylated nylon ("EF30T" made by Nagase ChemteX Corporation), 60 parts by mass of conductive tin oxide ("S-2000" made by Mitsubishi Materials Corporation), 30 parts by mass of urethane particles ("art pearl C600" made by Negamikogyo, average particle diameter 10 μm), 1 part by mass of citric acid (cross-linking agent), and 300 parts by mass of methanol are mixed, and the composition for forming surface layer is prepared. Next, the composition for forming surface layer is coated by a roll on a surface of the base layer, heated at 120° C. for 50 minutes, and a surface layer with a thickness of 10 μm is formed on an outer periphery of the base layer. Accordingly, the charging roll according to implementation example 1 is made.

Implementation Examples 2-3

Except that the ion-conductive agent is changed in the preparation of the conductive rubber composition, the charging roll is made similarly to implementation example 1.

Implementation Examples 4-5

Except that the carbon black is changed in the preparation of the conductive rubber composition, the charging roll is made similarly to implementation example 1.

Implementation Example 6

Except that the cross-linkable rubber is changed in the preparation of the conductive rubber composition, the charging roll is made similarly to implementation example 1.

Implementation Examples 7-8

Except that the polymer is changed in the preparation of the composition for forming surface layer, the charging roll is made similarly to implementation example 1.
polyurethane: "Takelac W6061" made by Mitsui Chemicals
acrylic resin: "Paracron Precoat 200" made by Negamikogyo Comparison Examples 1-3

Except that the ion-conductive agent is changed in the preparation of the conductive rubber composition, the charging roll is made similarly to implementation example 1.

Comparison Example 4

Except that the carbon black is not blended in the preparation of the conductive rubber composition, the charging roll is made similarly to implementation example 1.

For each of the charging rolls that are made, evaluation of bleeding and evaluation of charging amount are performed. Evaluation results, blending composition of the conductive rubber composition (parts by mass), and blending composition of the composition for forming surface layer (parts by mass) are shown in the following table.

(Evaluation of Bleeding)

"ECOSYS P5026cdw" made by Kyocera is used as an evaluation machine, the charging roll that is made is set in a drum unit and is placed in an environment of 32.5° C.×85% RH for 12 hours. Thereafter, halftone images are output in an environment of 23° C.×53% RH. A case that white streaks of a drum pitch due to the bleeding of the ion-conductive agent from the charging roll disappear when there are less than 20 pieces of the output images is designated as "◯", and a case that the white streaks of a drum pitch do not disappear even if there are 20 pieces or more of the output images is designated as "x".

(Evaluation of Charging Amount)

"ECOSYS P5026cdw" made by Kyocera is used as an evaluation machine, the charging roll that is made is set in a drum unit, and the charging amount when 1200 V is applied in an environment of 10° C.×10% RH is measured. A case that the charging amount is beyond 300 V is designated as "◯", and a case that the charging amount is below 300 V is designated as "x".

the base layer is a cross-linked body of a conductive rubber composition containing
(a) a cross-linkable rubber,
(b) a cross-linking agent,
(c) an ion-conductive agent represented by general formula (1) below, and
(d) carbon black.

[Chemical formula 1]

(1)

TABLE 1

|  |  | Implementation example | | | | | | | | Comparison example | | | |
| --- | --- | --- | --- | --- | --- | --- | --- | --- | --- | --- | --- | --- | --- |
|  |  | 1 | 2 | 3 | 4 | 5 | 6 | 7 | 8 | 1 | 2 | 3 | 4 |
| Base layer composition | ECO | 100 | 100 | 100 | 100 | 100 | — | 100 | 100 | 100 | 100 | 100 | 100 |
|  | NBR | — | — | — | — | — | 100 | — | — | — | — | — | — |
|  | Cross-linking agent (peroxide) | 3 | 3 | 3 | 3 | 3 | 3 | 3 | 3 | 3 | 3 | 3 | 3 |
|  | Ion-conductive agent <1> Diallyl/C1/C6-TFSI | 1 | — | — | 1 | 1 | 1 | 1 | 1 | — | — | — | 1 |
|  | Ion-conductive agent <2> Diallyl/C1/C8-TFSI | — | 1 | — | — | — | — | — | — | — | — | — | — |
|  | Ion-conductive agent <3> Diallyl/C2/C6-TFSI | — | — | 1 | — | — | — | — | — | — | — | — | — |
|  | Ion-conductive agent <4> Diallyl/C1/C9-TFSI | — | — | — | — | — | — | — | — | 1 | — | — | — |
|  | Ion-conductive agent <5> Diallyl/C1/C5-TFSI | — | — | — | — | — | — | — | — | — | 1 | — | — |
|  | Ion-conductive agent <6> Diallyl/C3/C6-TFSI | — | — | — | — | — | — | — | — | — | — | 1 | — |
|  | Carbon black <1> 42 m²/g | 20 | 20 | 20 | — | — | 20 | 20 | 20 | 20 | 20 | 20 | — |
|  | Carbon black <2> 142 m²/g | — | — | — | 25 | — | — | — | — | — | — | — | — |
|  | Carbon black <3> 240 m²/g | — | — | — | — | 10 | — | — | — | — | — | — | — |
|  | Stearic acid | 0.7 | 0.7 | 0.7 | 0.7 | 0.7 | 0.7 | 0.7 | 0.7 | 0.7 | 0.7 | 0.7 | 0.7 |
|  | Zinc oxide | 5 | 5 | 5 | 5 | 5 | 5 | 5 | 5 | 5 | 5 | 5 | 5 |
|  | Hydrotalcite | 2 | 2 | 2 | 2 | 2 | 2 | 2 | 2 | 2 | 2 | 2 | 2 |
| Surface layer composition | Nylon | 100 | 100 | 100 | 100 | 100 | 100 | — | — | 100 | 100 | 100 | 100 |
|  | Polyurethane | — | — | — | — | — | — | 100 | — | — | — | — | — |
|  | Acrylic resin | — | — | — | — | — | — | — | 100 | — | — | — | — |
|  | Conductive tin oxide | 60 | 60 | 60 | 60 | 60 | 60 | 60 | 60 | 60 | 60 | 60 | 60 |
|  | Urethane particles | 30 | 30 | 30 | 30 | 30 | 30 | 30 | 30 | 30 | 30 | 30 | 30 |
|  | Citric acid (cross-linking agent) | 1 | 1 | 1 | 1 | 1 | 1 | 1 | 1 | 1 | 1 | 1 | 1 |
|  | Methanol | 300 | 300 | 300 | 300 | 300 | 300 | 300 | 300 | 300 | 300 | 300 | 300 |
|  | Thickness of surface layer (μm) | 10 | 10 | 10 | 10 | 10 | 10 | 10 | 10 | 10 | 10 | 10 | 10 |
| Evaluation | Bleeding | ◯ | ◯ | ◯ | ◯ | ◯ | ◯ | ◯ | ◯ | X | ◯ | X | X |
|  | Charging amount | ◯ | ◯ | ◯ | ◯ | ◯ | ◯ | ◯ | ◯ | ◯ | X | ◯ | ◯ |

According to table 1, it is seen that in the configuration satisfying claim 1 of the present application, image defects caused by the bleeding of the ion-conductive agent can be suppressed and excellent chargeability can be maintained. When the specified ion-conductive agent and the carbon black are not used in combination, as in the comparison examples, the above effect is not obtained. Besides, according to implementation examples 1-3, comparison examples 1-3, it is seen that in the above general formula (1), if $R^3$ has a carbon number of 3 or more, even if $R^4$ is a linear alkyl group having a carbon number of 6-8, the bleeding of the ion-conductive agent is not suppressed; if $R^4$ has a carbon number of 9 or more, even if $R^3$ has a carbon number of 1-2, the bleeding of the ion-conductive agent is not suppressed; if $R^4$ has a carbon number of 5 or less, the chargeability is not satisfied.

In some of exemplary embodiments, the charging member for an electrophotographic apparatus according to the disclosure has a base layer composed of a conductive rubber elastomer and a surface layer, wherein Here, $R^1$ and $R^2$ are allyl groups, $R^3$ is a methyl group or an ethyl group, and $R^4$ is a linear alkyl group having a carbon number of 6-8; $X^-$ is a sulfonate anion having a fluorine atom or a bis(sulfonyl) imide anion having a fluorine atom.

A specific surface area of the (d) carbon black may be within a range of 40-300 m²/g. In addition, the specific surface area of the (d) carbon black may be within a range of 42-240 m²/g. The $R^4$ may be a linear alkyl group having a carbon number of 6. The $X^-$ may be a N, N-bis(trifluoromethane sulfonyl) imide anion. A content of the (c) ion-conductive agent may be within a range of 0.1-10 parts by mass with respect to 100 parts by mass of the (a) cross-linkable rubber. A content of the (d) carbon black may be within a range of 5-40 parts by mass with respect to 100 parts by mass of the (a) cross-linkable rubber. The surface layer may contain at least one component selected from polyamide, polyurethane, and acrylic resin. In addition, the surface layer may contain at least one component selected from polyamide and polyurethane. In addition, the surface layer may be formed of a composition containing polyamide, citric acid, conductive tin oxide, and urethane particles. Polymer components of the surface layer may be cross-linked.

The charging member for an electrophotographic apparatus may have a shaft body, the base layer, and the surface layer, wherein the base layer is formed on an outer periphery of the shaft body, and the surface layer is formed on an outer periphery of the base layer.

According to the charging member for an electrophotographic apparatus of the disclosure, the base layer is the cross-linked body of the conductive rubber composition containing the (a) cross-linkable rubber, the (b) cross-linking agent, the (c) ion-conductive agent represented by the above general formula (1), and the (d) carbon black, and thus the image defects caused by the bleeding of the ion-conductive agent can be suppressed and excellent chargeability can be maintained. It is inferred that this is because the cation of the ion-conductive agent represented by the above general formula (1) forms, by having two aryl groups, a bond with the cross-linkable rubber during the cross-linking of the cross-linkable rubber of the base layer and the cation is fixed, and the cation which does not form a bond with the cross-linkable rubber is adsorbed by the carbon black due to the interaction between the linear alkyl group represented by $R^4$ and having a carbon number of 6-8 and the (d) carbon black in the base layer.

At this time, if the specific surface area of the (d) carbon black is within a range of 40-300 m²/g, a balance between an effect of suppressing the bleeding of the ion-conductive agent and the chargeability is excellent. If the above specific surface area is within a range of 42-240 m²/g, the balance between the effect of suppressing the bleeding of the ion-conductive agent and the chargeability is more excellent. Besides, if the above $X^-$ is N, N-bis(trifluoromethane sulfonyl) imide anion, not only is the (c) ion-conductive agent prone to ion dissociation and a value of the relative dielectric constant of the (c) ion-conductive agent can be increased to increase the charging performance of the base layer, but the degree of freedom of the cation is also increased, and the cation having two aryl groups easily gets a high molecular weight. Besides, if the content of the above (c) ion-conductive agent is within a range of 0.1-10 parts by mass with respect to 100 parts by mass of the (a) cross-linkable rubber, a balance between conductivity and the effect of suppressing the bleeding of the ion-conductive agent is excellent. Besides, if the content of the above (d) carbon black is within a range of 5-40 parts by mass with respect to 100 parts by mass of the (a) cross-linkable rubber, a balance between hardness of the base layer and the conductivity is excellent.

Besides, if the above surface layer contains at least one component selected from polyamide, polyurethane, and acrylic resin, although the ion-conductive agent tends to easily pass through the surface layer, the effect of suppressing the bleeding of the ion-conductive agent is excellent according to the disclosure even with this surface layer. Besides, if the polymer components of the above surface layer are cross-linked, the bleeding of the (c) ion-conductive agent is suppressed more easily compared with a case that the polymer components are not cross-linked.

Embodiments and implementation examples of the disclosure are described in the above, but the disclosure is not limited to any one of the above embodiments and implementation examples, and various modifications can be made in a scope not departing from the gist of the disclosure.

What is claimed is:

1. A charging member for an electrophotographic apparatus comprising a shaft body, a base layer composed of a conductive rubber elastomer and a surface layer, and the base layer is formed on an outer periphery of the shaft body, and the surface layer is formed on an outer periphery of the base layer, wherein the base layer is a cross-linked body of a conductive rubber composition containing
(a) a cross-linkable rubber,
(b) a cross-linking agent,
(c) an ion-conductive agent represented by a general formula (1) below, and a content of the (c) ion-conductive agent is within a range of 0.1-10 parts by mass with respect to 100 parts by mass of the (a) cross-linkable rubber, and
(d) carbon black, and a content of the (d) carbon black is within a range of 5-40 parts by mass with respect to 100 parts by mass of the (a) cross-linkable rubber, and the (d) carbon black has a specific surface area, and the specific surface area of the (d) carbon black is within a range of 42-240 m²/g, the surface layer is formed of a composition containing polyamide, citric acid, conductive tin oxide, and urethane particles, and the surface layer contains polymer components, and the polymer components of the surface layer are cross-linked;

(1)

here, $R^1$ and $R^2$ are allyl groups, $R^3$ is a methyl group or an ethyl group, and $R^4$ is a linear alkyl group having a carbon number of 6; $X^-$ is a N,N-bis(trifluoromethane sulfonyl) imide anion.

* * * * *